United States Patent
Kim et al.

(10) Patent No.: US 11,172,421 B2
(45) Date of Patent: Nov. 9, 2021

(54) METHOD AND APPARATUS FOR CELL RESELECTION BY RANKING CELLS USING PLMN OFFSET IN UNLICENSED FREQUENCY

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 93 days.

(21) Appl. No.: 16/537,428

(22) Filed: Aug. 9, 2019

(65) Prior Publication Data

US 2020/0053620 A1 Feb. 13, 2020

(30) Foreign Application Priority Data

Aug. 10, 2018 (KR) .................. 10-2018-0093508

(51) Int. Cl.
| | |
|---|---|
| H04L 12/28 | (2006.01) |
| H04W 36/30 | (2009.01) |
| H04W 36/08 | (2009.01) |
| H04W 16/14 | (2009.01) |
| H04W 36/00 | (2009.01) |
| H04W 84/04 | (2009.01) |

(52) U.S. Cl.
CPC ........... *H04W 36/30* (2013.01); *H04W 16/14* (2013.01); *H04W 36/00835* (2018.08); *H04W 36/08* (2013.01); *H04W 84/042* (2013.01)

(58) Field of Classification Search
CPC ........................................................ H04L 12/27
USPC ........................................................ 370/329
See application file for complete search history.

(56) References Cited

U.S. PATENT DOCUMENTS

| | | | |
|---|---|---|---|
| 2017/0171769 A1* | 6/2017 | Jung | ..................... H04W 24/02 |
| 2020/0053620 A1* | 2/2020 | Kim | ..................... H04W 36/30 |

OTHER PUBLICATIONS

3rd Generation Partnership Project (3GPP), "Technical Specification Group Radio Access Network; NR; User Equipment (UE) procedures in Idle mode and RRC Inactive state (Release 15)," Section 5.2 of 3GPP TS 38.304 V15.0.0, Jun. 2018, 15 pages.

* cited by examiner

*Primary Examiner* — Dang T Ton
(74) *Attorney, Agent, or Firm* — Lee, Hong, Degerman, Kang & Waimey

(57) ABSTRACT

A method and an apparatus for cell reselection by ranking cells using PLMN offset in unlicensed frequency in a wireless communication system is provided. The method, by a UE, may include measuring a quality of a serving cell and a neighboring cell, receiving a PLMN offset on unlicensed frequency from a network, determining ranking of the serving cell and the neighboring cell based on the PLMN offset and the measured quality, and performing a cell reselection based on the determined ranking.

6 Claims, 12 Drawing Sheets

METHOD AND APPARATUS FOR CELL RESELECTION BY RANKING CELLS USING PLMN OFFSET IN UNLICENSED FREQUENCY

CROSS-REFERENCE TO RELATED APPLICATIONS

Pursuant to 35 U.S.C. § 119(a), this application claims the benefit of earlier filing date and right of priority to Korean Patent Application No. 10-2018-0093508, filed on Aug. 10, 2018, the contents of which are hereby incorporated by reference herein in its entirety.

BACKGROUND OF THE INVENTION

Field of the Invention

The present invention relates to wireless communications, and more particularly, to a method and apparatus for cell reselection using PLMN offset in unlicensed frequency.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR is a technology that operates on a very wideband compared with LTE. In order to support flexible broadband operation, NR has the following design principles different from LTE in terms of broadband support.

Carrier aggregation with at least one secondary cell (SCell) operating in the unlicensed spectrum is referred to as licensed-assisted access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNodeB (eNB) and user equipment (UE) apply listen-before-talk (LBT) before performing a transmission on LAA SCell. When LBT is applied, the transmitter listens to/senses the channel to determine whether the channel is free or busy. If the channel is determined to be free, the transmitter may perform the transmission. Otherwise, it does not perform the transmission. If an LAA eNB uses channel access signals of other technologies for the purpose of LAA channel access, it shall continue to meet the LAA maximum energy detection threshold requirement.

SUMMARY OF THE INVENTION

NR standalone operation on unlicensed bands is being discussed. Therefore, a method for supporting NR standalone operation on unlicensed bands efficiently is required.

In an aspect, a method performed by a wireless device in a wireless communication system is provided. The method may include measuring a quality of a serving cell and a neighboring cell, receiving a PLMN offset on unlicensed frequency from a network, determining ranking of the serving cell and the neighboring cell based on the PLMN offset and the measured quality, and performing a cell reselection based on the determined ranking.

In another aspect, a wireless device in a wireless communication system is provided. The wireless device may include a memory, a transceiver, and a processor, operably coupled to the memory and the transceiver. The processor may be configured to measure a quality of a serving cell and a neighboring cell, control the transceiver to receive a PLMN offset on unlicensed frequency from a network, determine ranking of the serving cell and the neighboring cell based on the PLMN offset and the measured quality, and control the transceiver to perform a cell reselection based on the determined ranking.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
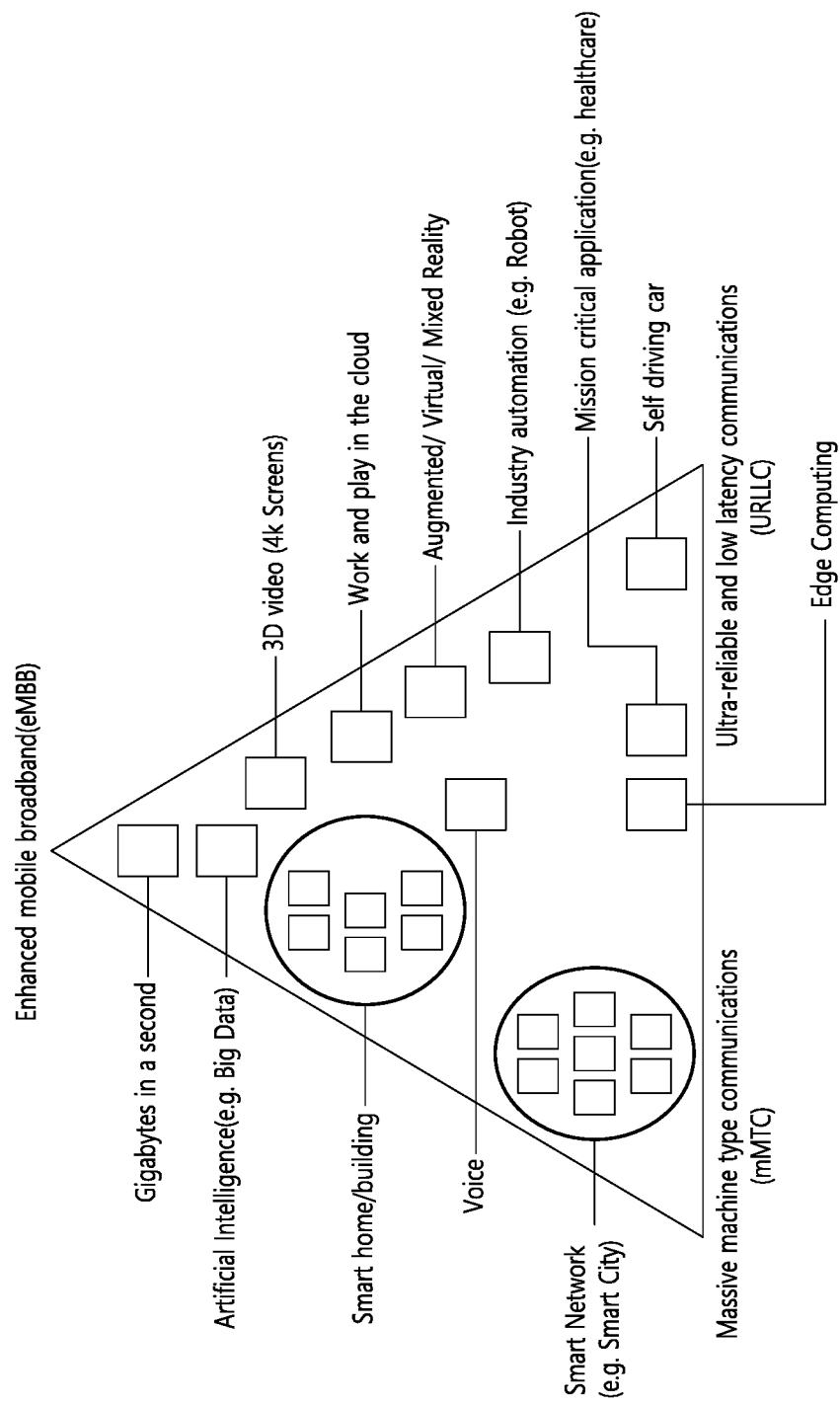
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
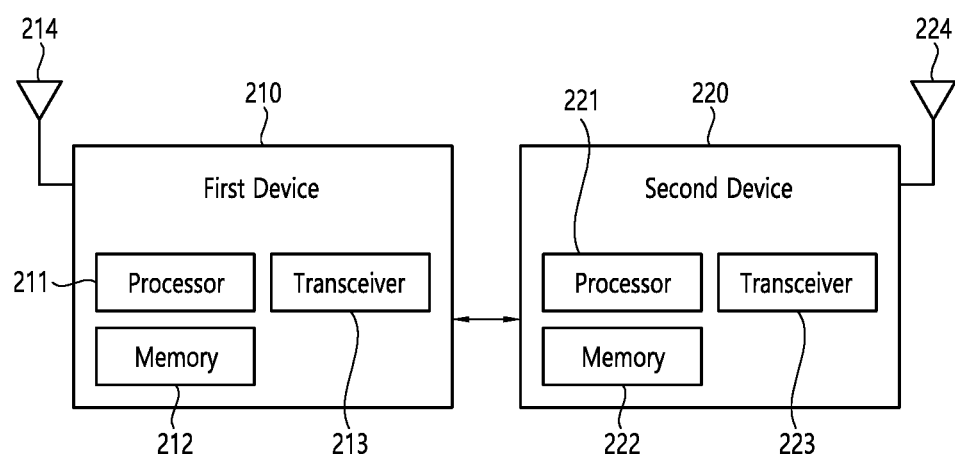
FIG. 2 shows an example of a wireless communication system to which the technical features of the present invention can be applied.

FIG. 2 shows an example of a wireless communication system to which the technical features of the present invention can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
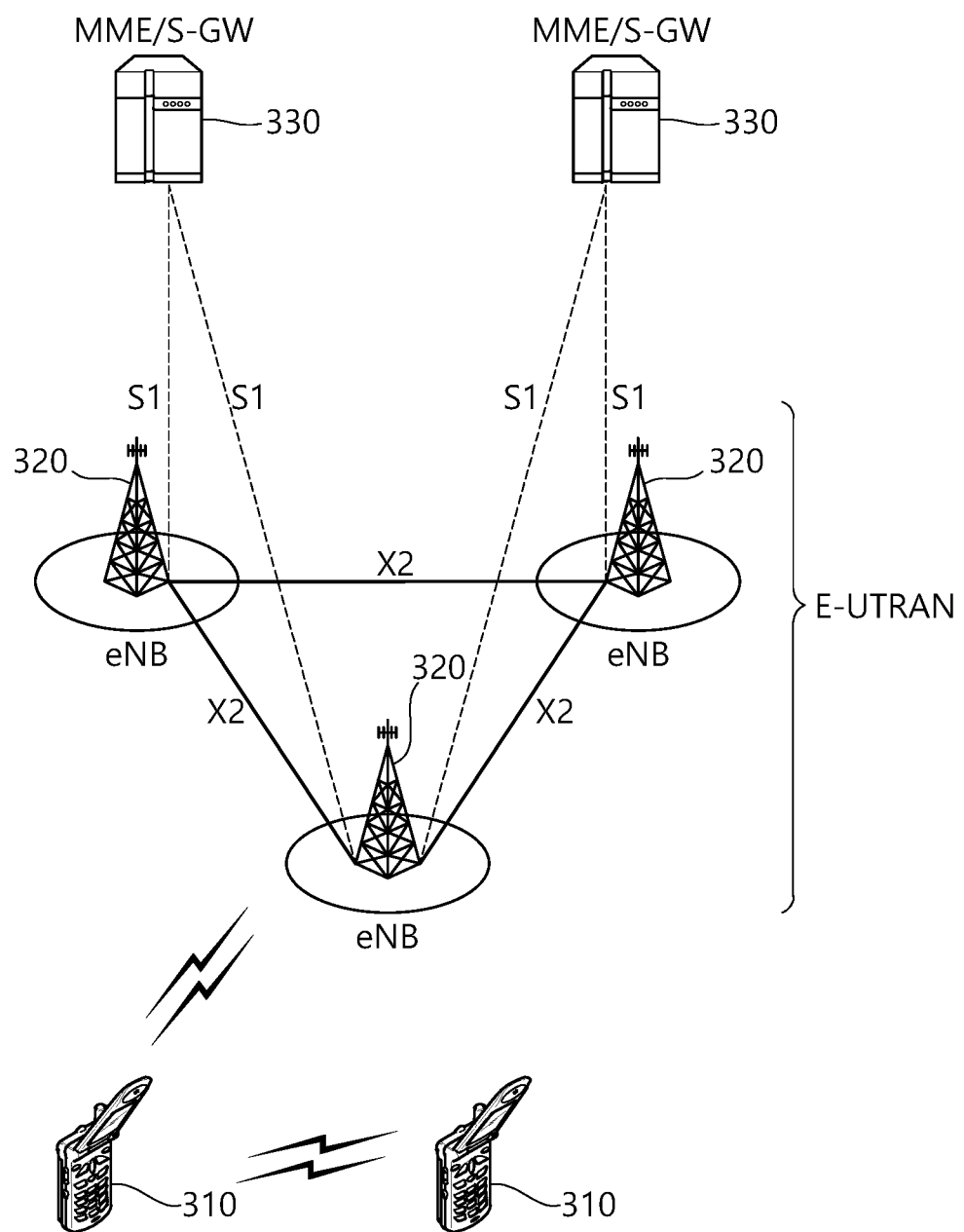
FIG. 3 shows another example of a wireless communication system to which the technical features of the present invention can be applied.

FIG. 3 shows another example of a wireless communication system to which the technical features of the present invention can be applied. Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
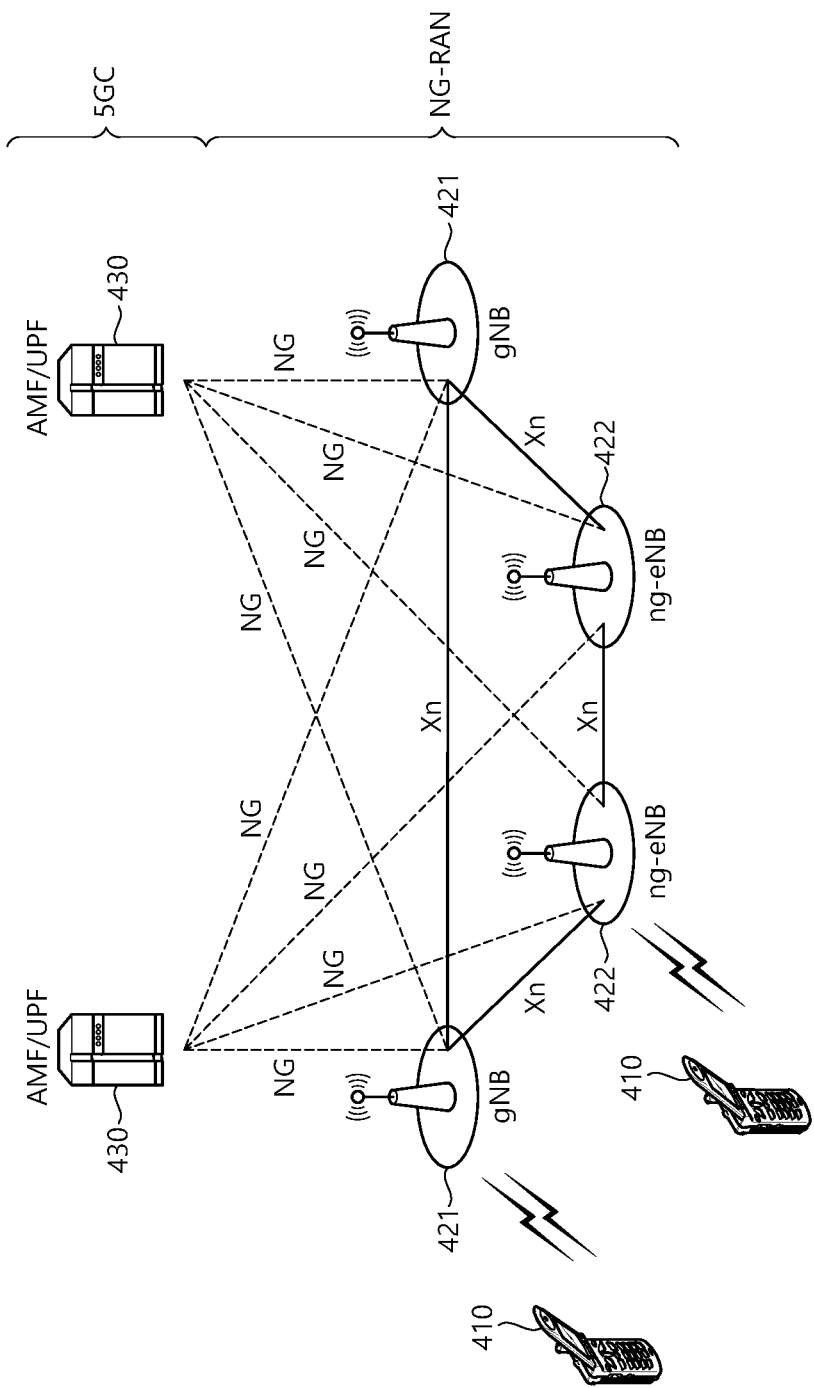
FIG. 4 shows another example of a wireless communication system to which the technical features of the present invention can be applied.

FIG. 4 shows another example of a wireless communication system to which the technical features of the present invention can be applied. Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
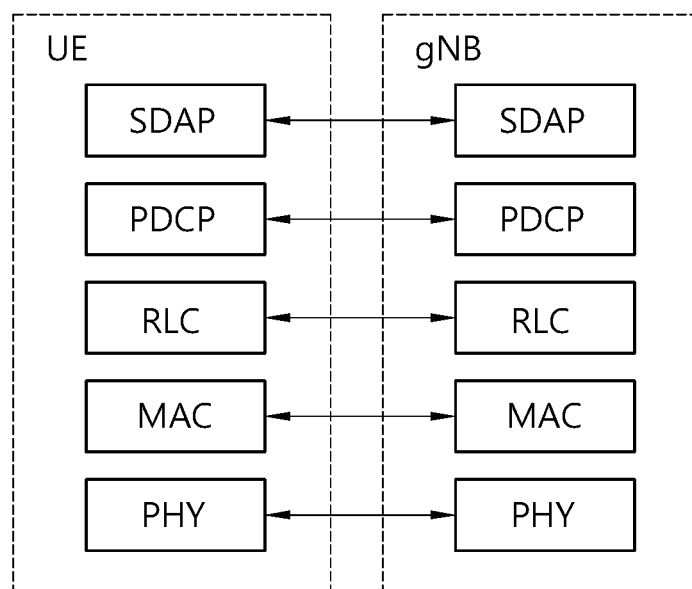
FIG. 5 shows a block diagram of a user plane protocol stack to which the technical features of the present invention can be applied.
Figure 6:
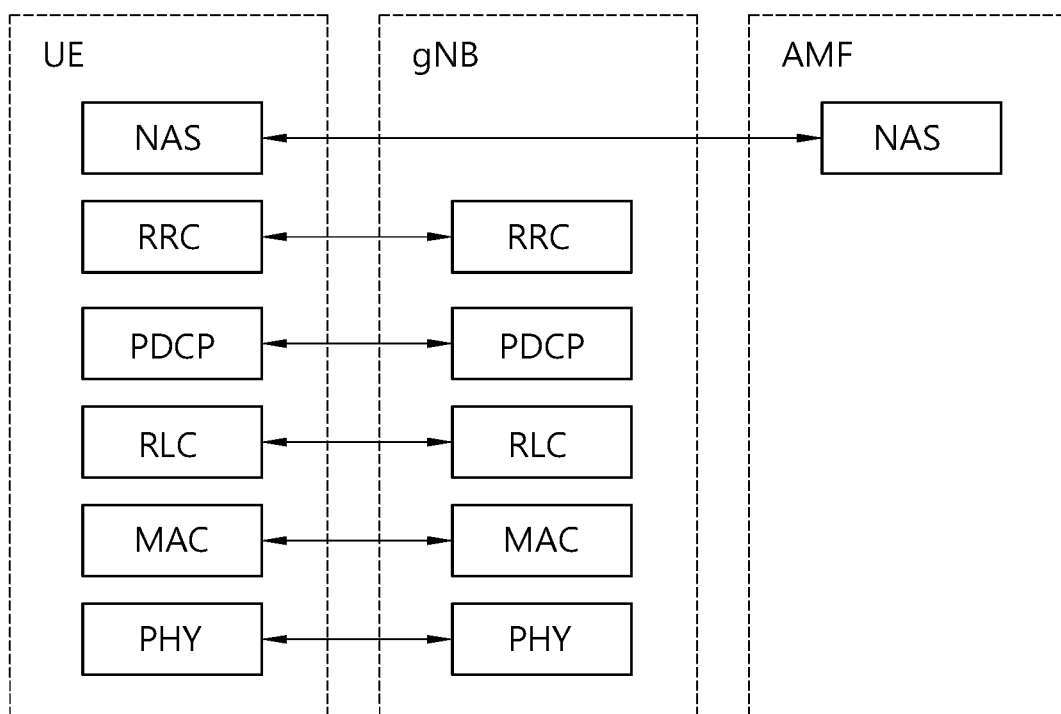
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied. The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, the PLMN will be described. The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted. In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN. Next, among the cells provided by the selected PLMN, the UE selects a cell having signal quality and characteristic which may receive a suitable service. The PLMN selection has been performed in EMM-DEREGISTERED and ECM-IDLE.

Meanwhile, the AS layer may support for PLMN selection (i.e. providing available PLMNs to UE NAS) for a UE in RRC_INACTIVE. Considering that a UE in RRC_INACTIVE is in EMM_CONNECTED, the PLMN selection cannot be applied to RRC_INACTIVE because that PLMN selection in LTE are only applicable to EMM_IDLE and RRC_IDLE.

Actually, UEs in their HPLMN do not perform PLMN selection during in RRC_INACTIVE. However, unless PLMN selection (i.e. providing available PLMNs to UE NAS requested by the search of higher priority PLMN) is supported, UEs in a VPLMN, in other words, roaming UEs could not have a chance to return to the HPLMN until transition to RRC_IDLE, and this would lead a service availability degradation of the UEs. Therefore, in order to support PLMN selection (i.e. providing available PLMNs to UE NAS) in EMM_CONNECTED and RRC_INACTIVE, an enhancement of interaction between the UE AS and the UE NAS is required.

Hereinafter, a procedure for cell selection and reselection will be described. It may be referred to as Section 5.2 of 3GPP TS 38.304 V15.0.0 (2018-06).

UE shall perform measurements for cell selection and reselection purposes.

The NAS can control the RAT(s) in which the cell selection should be performed, for instance by indicating RAT(s) associated with the selected PLMN, and by maintaining a list of forbidden registration area(s) and a list of equivalent PLMNs. The UE shall select a suitable cell based on RRC_IDLE or RRC_INACTIVE state measurements and cell selection criteria.

In order to expedite the cell selection process, stored information for several RATs, if available, may be used by the UE.

When camped on a cell, the UE shall regularly search for a better cell according to the cell reselection criteria. If a better cell is found, that cell is selected. The change of cell may imply a change of RAT.

The NAS is informed if the cell selection and reselection result in changes in the received system information relevant for NAS.

For normal service, the UE shall camp on a suitable cell, monitor control channel(s) of that cell so that the UE can:
  receive system information from the PLMN; and
  receive registration area information from the PLMN, e.g., tracking area information; and
    receive other AS and NAS Information; and
    if registered:
    receive paging and notification messages from the PLMN; and
    initiate transfer to Connected mode.

For cell selection, measurement quantity of a cell is up to UE implementation.

For cell reselection in multi-beam operations, using a maximum number (nrofSS-ResourcesToAverage) of beams to be considered and a threshold (absThreshSS-Consolidation) which are configured for a cell, the measurement quantity of this cell is derived amongst the beams corresponding to the same cell based on SS/PBCH block as follows:
  if the highest beam measurement quantity value is below the threshold:
  derive a cell measurement quantity as the highest beam measurement quantity value, where each beam measurement quantity is described in TS 38.215 [11].
    else:
    derive a cell measurement quantity as the linear average of the power values of up to the maximum number of highest beam measurement quantity values above the threshold.

Cell selection is performed by one of the following two procedures:
  a) Initial cell selection (no prior knowledge of which RF channels are NR carriers):
  1. The UE shall scan all RF channels in the NR bands according to its capabilities to find a suitable cell.
  2. On each carrier frequency, the UE need only search for the strongest cell.
  3. Once a suitable cell is found, this cell shall be selected.
  b) Cell selection by leveraging stored information:
  1. This procedure requires stored information of carrier frequencies and optionally also information on cell parameters from previously received measurement control information elements or from previously detected cells.
  2. Once the UE has found a suitable cell, the UE shall select it.
  3. If no suitable cell is found, the initial cell selection procedure in a) shall be started.

Absolute priorities of different NR frequencies or inter-RAT frequencies may be provided to the UE in the system information, in the RRCRelease message, or by inheriting from another RAT at inter-RAT cell (re)selection. In the case of system information, a NR frequency or inter-RAT frequency may be listed without providing a priority (i.e. the field cellReselectionPriority is absent for that frequency). If priorities are provided in dedicated signalling, the UE shall ignore all the priorities provided in system information.

The prioritization among the frequencies which UE considers to be the highest priority frequency is left to UE implementation.

The UE shall only perform cell reselection evaluation for NR frequencies and inter-RAT frequencies that are given in system information and for which the UE has a priority provided.

The UE shall delete priorities provided by dedicated signalling when:
  the UE enters a different RRC state; or
  the optional validity time of dedicated priorities (T320) expires; or
  a PLMN selection is performed on request by NAS [23.122].

Equal priorities between RATs are not supported.

The UE shall only perform cell reselection evaluation for NR frequencies and inter-RAT frequencies that are given in system information and for which the UE has a priority provided.

The UE shall not consider any black listed cells as candidate for cell reselection.

The UE shall inherit the priorities provided by dedicated signalling and the remaining validity time (i.e. T320 in NR and E-UTRA), if configured, at inter-RAT cell (re)selection.

The network may assign dedicated cell reselection priorities for frequencies not configured by system information.

Network providers may share unlicensed frequency. Therefore, there may be multiple PLMNs on one unlicensed frequency. For a certain wireless device, a cell in the unlicensed frequency may belong to registered PLMN and/or equivalent PLMN. The certain device may perform data transmission with the cell which belongs to registered PLMN and/or equivalent PLMN. However, for the certain wireless device, other cell in the unlicensed frequency may not belong to registered PLMN and/or equivalent PLMN. The certain device may not perform data transmission with the other cell which does not belong to registered PLMN and/or equivalent PLMN.

For example, in unlicensed frequency, for the certain wireless device, a cell having a highest reference signal received power (RSRP) quantity may not belong to registered PLMN and/or equivalent PLMN. Therefore, the wireless device may not always perform cell reselection with the cell having the highest RSRP quantity.

In addition, data transmission can be performed only while a channel is occupied by a cell. However, cells on unlicensed frequency may not be always activated. For example, the highest ranked cell on unlicensed frequency may not be activated. On the other hand, RRM measurement is long term measurement. This means that although a certain cell is considered as the highest ranked cell based on existing RRM measurement, other cell can have a best quality temporarily, while the highest ranked cell keep quiet.

The highest ranked cell based on the RRM measurement (or RSRP measurement, etc.) may not be suitable due to the PLMN condition. However, the second highest ranked cell based on the RRM measurement may be suitable due to the PLMN condition. In this case, a wireless device may perform a date transmission using the second highest ranked cell without interference from the highest ranked cell. Therefore, a method for cell reselection using cell ranking criterion based on both of the RRM measurement and the PLMN condition will be needed.

Figure 7:
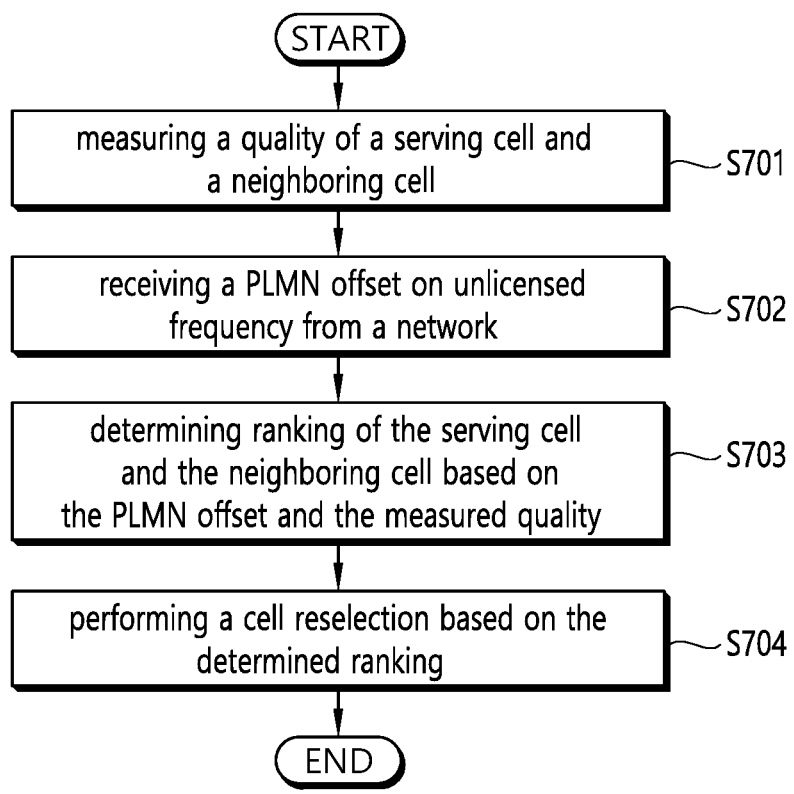
FIG. 7 shows a method for cell reselection by ranking cells using PLMN offset in unlicensed frequency according to some embodiments of the present disclosure.

Hereinafter, cell reselection criterion using PLMN offset in unlicensed frequency will be described. FIG. 7 shows a method for cell reselection by ranking cells using PLMN offset in unlicensed frequency according to some embodiments of the present disclosure.

In step 701, a wireless device may measure a quality of a serving cell and a neighboring cell. For example, the wireless device may perform RSRP measurement on the serving cell and the neighboring cell. For another example, the wireless device may perform RRM measurement on the serving cell and the neighboring cell. The measured quantity ($Q_{meas}$) may be used to determine ranking of the serving cell and the neighboring cell.

According to some embodiments of the present disclosure, the wireless device may detect plurality of serving cells and/or plurality of neighboring cells. The wireless device may measure quality of plurality of serving cells and plurality of neighboring cells respectively.

In step 702, a wireless device may receive a PLMN offset on unlicensed frequency from a network. For example, a wireless device may receive a positive PLMN offset (+$Qoffset_{PLMN}$) for cells which belong to registered PLMN and/or equivalent PLMN. For another example, a wireless device may receive a negative PLMN offset (−$Qoffset_{PLMN}$) for cells which do not belong to registered PLMN and/or equivalent PLMN.

In step 703, a wireless device may determine ranking of the serving cell and the neighboring cell based on the PLMN offset and the measured quality.

Firstly, the wireless device may determine whether the neighboring cell belongs to registered PLMN and/or equivalent PLMN.

According to some embodiments of the present disclosure, the wireless device may receive a PLMN information of the neighboring cell from the network. The PLMN information may inform whether the neighboring cell belongs to registered PLMN and/or equivalent PLMN or not. The PLMN information may be involved in system information massage (for example, SIB 1). The wireless device may acquire the PLMN information of the neighboring cell by receiving system information message from the neighboring cell. The wireless device may determine whether the neighboring cell belongs to registered PLMN and/or equivalent PLMN based on the PLMN information.

According to some embodiments of the present disclosure, the serving cell may already belong to registered PLMN and/or equivalent PLMN. The wireless device may already know that the serving cell belong to registered PLMN and/or equivalent PLMN before receiving a PLMN information of the neighboring cell.

According to some embodiments of the present disclosure, a wireless device may receive a PLMN list from a network. The PLMN list may include identities (IDs) of registered PLMN and/or equivalent PLMN for the wireless device. The PLMN information received from the neighboring cell may include a PLMN ID of the neighboring cell. The wireless device may check that PLMN ID of the neighboring cell is included in the PLMN list. The wireless device may determine whether the neighboring cell belongs to registered PLMN and/or equivalent PLMN by comparing the PLMN ID and the PLMN list. When the PLMN ID is included in the PLMN list, the wireless device may determine that the neighboring cell belongs to registered PLMN and/or equivalent PLMN. When the PLMN ID is not included in the PLMN list, the wireless device may determine that the neighboring cell does not belong to registered PLMN and/or equivalent PLMN.

According to some embodiments of the present disclosure, a wireless device may receive PLMN information of neighboring cells from a network. For example, a list of PLMN ID of neighboring cells may be provided to a wireless device form serving cell. Serving cell may provide a list of PLMN ID with information of neighboring cells. A PLMN information may inform that whether neighboring cells belong to registered PLMN and/or equivalent PLMN or not. A wireless device may determine whether a neighboring cell belong to registered PLMN and/or equivalent PLMN based on PLMN information received from serving cell.

Secondly, the wireless device may determine the ranking of the serving cell and the neighboring cell by applying the PLMN offset.

According to some embodiments of the present disclosure, the wireless device may apply a positive PLMN offset to determine the ranking of the serving cell and the neighboring cell. When the neighboring cell belongs to the registered PLMN and/or equivalent PLMN, the wireless device may apply the positive PLMN offset to ranking of the neighboring cell (or measurement quantity of the neighboring cell i.e. $Q_{meas,n}$). For example, the wireless device may apply the positive PLMN offset to the ranking of the serving cell (or measurement quantity of the serving cell i.e. $Q_{meas,s}$), when serving cell may belong to registered PLMN and/or equivalent PLMN.

According to some embodiments of the present disclosure, the wireless device may apply a negative PLMN offset to determine the ranking of the serving cell and the neighboring cell. When the neighboring cell does not belong to the registered PLMN and/or equivalent PLMN, the wireless device may apply the negative PLMN offset to ranking of the neighboring cell (or measurement quantity of the neighboring cell i.e. $Q_{meas,n}$). For example, the wireless device may apply the negative PLMN offset to the ranking of the serving cell (or measurement quantity of the serving cell i.e. $Q_{meas,s}$), when serving cell does not belong to registered PLMN and/or equivalent PLMN.

According to some embodiments of the present disclosure, a PLMN offset may be significantly bigger than other factor (for example, measurement quantity of a cell, $Q_{meas}$) for determining the ranking of the cells. Therefore, ranking of a cell which belongs to registered PLMN and/or equivalent PLMN could be ranked higher (or better) than a cell which does not belong to registered PLMN and/or equivalent PLMN.

In step 704, a wireless device may perform a cell reselection based on the determined ranking. For example, the wireless device may perform cell reselection with the highest ranked cell (or best ranked cell). According to some embodiments of the present disclosure, the highest ranked cell (or best ranked cell) may belongs to registered PLMN and/or equivalent PLMN because of a PLMN offset.

According to some embodiments of the present disclosure, a wireless device may perform cell reselection in the unlicensed frequency. For example, the serving cell and/or the neighboring cell may be on the unlicensed frequency. That is, the wireless device may camp on a cell in unlicensed frequency and attempt to reselect a new cell in unlicensed frequency. In this case, the wireless device may apply a PLMN offset only if the cell which is operated on unlicensed frequency.

According to some embodiments of the present disclosure, a wireless device may receive a frequency information of the serving cell and/or the neighboring cell from the network. The frequency information may inform that whether the neighboring cell is on the unlicensed frequency. The frequency information may be a Boolean type variable. The frequency information may be used to indicate whether carrier frequency is unlicensed frequency (value TRUE) or not (value FALSE)

According to some embodiments of the present disclosure, the wireless device operates in IDLE state or INACTIVE state on unlicensed frequency. If the wireless device supports IDLE/INACTIVE operation on unlicensed frequency (i.e. camping on unlicensed frequency), the wireless device may consider cells on the unlicensed frequency as candidates for cell reselection. The wireless device may perform neighbor frequency measurement not only for licensed frequency but also for unlicensed frequency.

Figure 8:
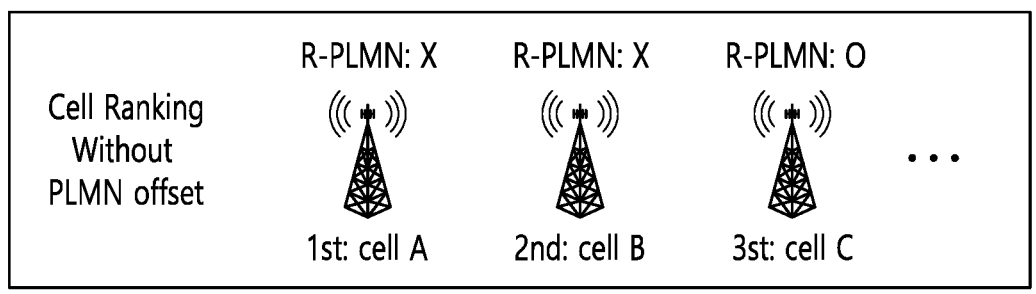
FIG. 8 shows an example of cell ranking criterion without PLMN offset.
Figure 9:
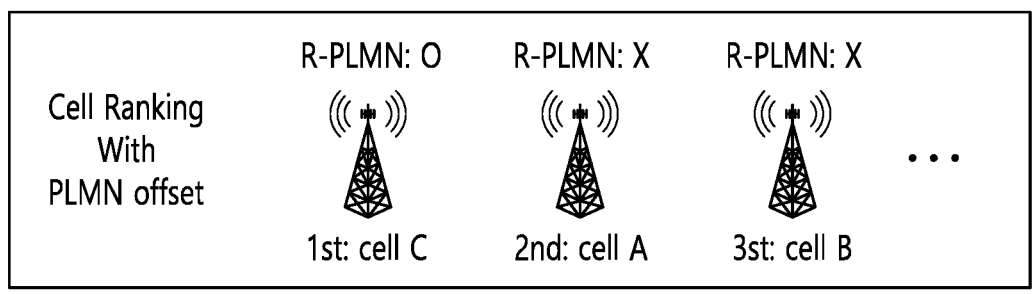
FIG. 9 shows an example of cell ranking criterion with PLMN offset.

Hereinafter, an example of a method for cell ranking criterion using PLMN offset in unlicensed frequency will be described. FIG. 8 shows an example of cell ranking criterion without PLMN offset. FIG. 9 shows an example of cell ranking criterion with PLMN offset.

Referring to FIG. 8 and FIG. 9, there may be plurality of cells on unlicensed frequency with different PLMN conditions for a certain wireless device. For example, cell A and cell B do not belong to registered PLMN, but cell C belongs to registered PLMN. FIG. 8 and FIG. 9 only show whether the cells belong to the registered PLMN or not. However, the present disclosure is not limited thereto. For example, the cells belong to equivalent PLMN may be treated by the same way as the cells belong to the registered PLMN.

Referring to FIG. 8, ranking of the cells may be determined without a PLMN offset. The ranking of the cells may be determined based on the measurement quantity (for example, RSRP quantity or RRM quantity).

The cell A may be the highest ($1^{st}$) cell. However, for the certain wireless device, the cell A may not belong to registered PLMN. The certain wireless device may not perform random access to the highest ranked cell (best ranked cell), i.e. cell A, because the cell A is not suitable for the wireless device.

Referring to FIG. 9, ranking of the cells may be determined with a PLMN offset. The ranking of the cells may be determined based on both of the PLMN offset and the measurement quantity.

The cell C may be the highest ($1^{st}$) cell. In this case, for the certain wireless device, the cell C may belong to registered PLMN. The certain wireless device may perform random access to the highest ranked cell (best ranked cell), i.e. cell C, because the cell C is suitable for the wireless device.

Hereinafter, an example of a method for cell reselection using PLMN offset in unlicensed frequency will be described.

According to some embodiments of the present disclosure, when a wireless device calculates ranking of serving cell or neighbour cell, the wireless device may add a positive offset only for a cell which belongs to registered PLMN or equivalent PLMN.

For example, the wireless device may receive a list of PLMN from a network. In this case, the wireless device applies the positive offset only to cell that belongs to one of the listed PLMN. A wireless device may applies the offset only if the cell is operated on unlicensed frequency.

For example, in a cell-ranking criterion, ranking of serving cells (Rs) and ranking of neighboring cells (Rn) may be defined as follows.

$$Rs = Q_{meas,s} + Q_{hyst} - Q\text{offset}_{temp} + Q\text{offset}_{PLMN}$$

$$Rn = Q_{meas,n} - Q\text{offset} - Q\text{offset}_{temp} + Q\text{offset}_{PLMN}$$

Where:

| | |
|---|---|
| $Q_{meas}$ | RSRP measurement quantity used in cell reselections. |
| Qoffset | For intra-frequency: Equals to $Q\text{offset}_{s,n}$, if $Q\text{offset}_{s,n}$ is valid, otherwise this equals to zero. For inter-frequency: Equals to $Q\text{offset}_{s,n}$ plus $Q\text{offset}_{frequency}$, if $Q\text{offset}_{s,n}$ is valid, otherwise this equals to $Q\text{offset}_{frequency}$. |
| $Q\text{offset}_{temp}$ | Offset temporarily applied to a cell. |
| $Q\text{offset}_{PLMN}$ | Offset applied to a cell which belongs to registered PLMN or equivalent PLMN on unlicensed frequency. |

According to some embodiments of the present disclosure, when a wireless device calculates ranking of serving cell or neighbour cell, the wireless device may add a negative offset only for a cell which does not belong to registered PLMN or equivalent PLMN.

For example, the wireless device may receive a list of PLMN from a network. In this case, the wireless device applies the negative offset only to cell that belongs to one of the listed PLMN. A wireless device may applies the offset only if the cell is operated on unlicensed frequency.

For example, in a cell-ranking criterion, ranking of serving cells (Rs) and ranking of neighboring cells (Rn) may be defined as follows.

$$Rs = Q_{meas,s} + Q_{hyst} - Q\text{offset}_{temp} - Q\text{offset}_{PLMN}$$

$$Rn = Q_{meas,n} - Q\text{offset} - Q\text{offset}_{temp} - Q\text{offset}_{PLMN}$$

where:

| | |
|---|---|
| $Q_{meas}$ | RSRP measurement quantity used in cell reselections. |
| Qoffset | For intra-frequency: Equals to $Q\text{offset}_{s,n}$, if $Q\text{offset}_{s,n}$ is valid, otherwise this equals to zero. For inter-frequency: Equals to $Q\text{offset}_{s,n}$ plus $Q\text{offset}_{frequency}$, if $Q\text{offset}_{s,n}$ is valid, otherwise this equals to $Q\text{offset}_{frequency}$. |
| $Q\text{offset}_{temp}$ | Offset temporarily applied to a cell. |
| $Q\text{offset}_{PLMN}$ | Offset applied to a cell which doesn't belong to registered PLMN or equivalent PLMN on unlicensed frequency. |

A list of neighbor frequencies can be provided by network via system information. To enable UE to distinguish whether neighbor frequency is licensed frequency or unlicensed frequency, unlicensed frequency indicator can be provided along with the list of neighbor frequencies.

EXAMPLE

| SIB4 information element |
|---|
| -- ASN1START<br>-- TAG-SIB4-START<br>SIB4 ::=    SEQUENCE {<br>    interFreqCarrierFreqList                  InterFreqCarrierFreqList,<br>    ...,<br>}<br>InterFreqCarrierFreqList ::=SEQUENCE (SIZE (1..maxFreq)) OF InterFreqCarrierFreqInfo<br>InterFreqCarrierFreqInfo ::= SEQUENCE {<br>    dl-CarrierFreq                          ARFCN-ValueNR,<br>    unlicensedFrequency                   Boolean,<br>    ...,<br>} |

| SIB4 field descriptions |
|---|
| absThreshSS-BlocksConsolidation<br>Threshold for consolidation of L1 measurements per RS index.<br>unlicensedFrequency<br>The field is used to indicate whether carrier frequency is unlicensed frequency (value TRUE) or not (value FALSE)<br>interFreqBlackCellList<br>List of blacklisted inter-frequency neighbouring cells.<br>interFreqCarrierFreqList<br>List of neighbouring carrier frequencies and frequency specific cell re-selection information. |

If a wireless device doesn't support IDLE/INACTIVE operation on unlicensed frequency, the wireless device may not consider cells on the unlicensed frequency as candidate for reselection. The wireless device may performs intra-/inter-frequency measurement only for licensed frequency according to the measurement rule, i.e. may not perform measurement for unlicensed frequency.

However, according to some embodiments of the present disclosure, if a wireless device supports IDLE/INACTIVE operation on unlicensed frequency, i.e. camping on unlicensed frequency, the wireless device may consider cells on the unlicensed frequency as candidate for reselection. The wireless device may performs neighbor frequency measurement not only for licensed frequency but also for unlicensed frequency.

According to some embodiments of the present disclosure, the wireless device may be an autonomous driving apparatus in communication with at least one of a mobile terminal, a network, and/or autonomous vehicles other than the UE.

According to some embodiments of the present disclosure shown in FIGS. 7 and 9, a wireless device may consider a PLMN condition for determining ranking of cells on unlicensed frequency. The wireless device may perform random access with the highest ranked cell (or the best ranked cell), since the highest ranked cell would belong to registered PLMN and/or equivalent PLMN.

Figure 10:
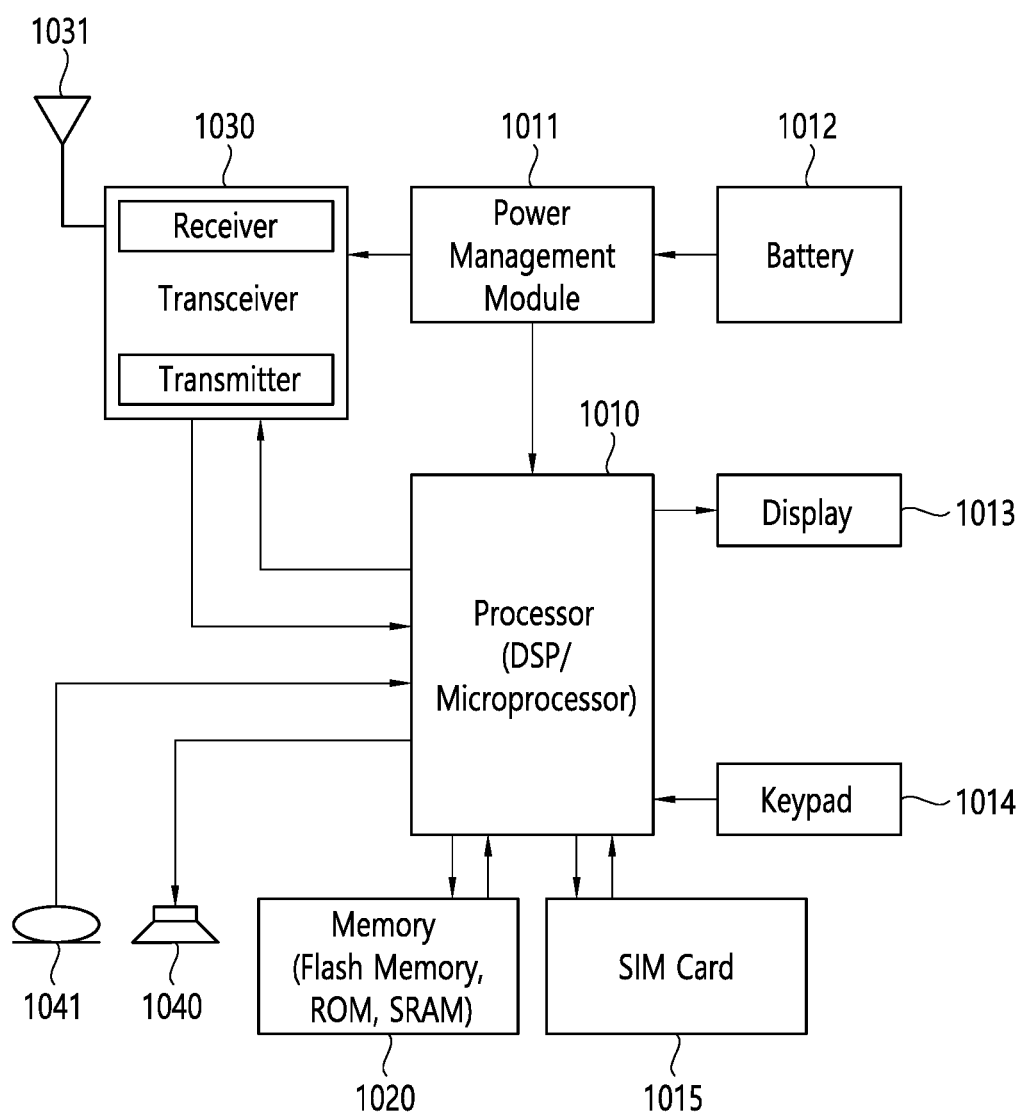
FIG. 10 shows a wireless device to implement an embodiment of the present invention.

FIG. 10 shows a wireless device to implement an embodiment of the present invention. The description of the same parts as those described above will be simplified or omitted.

A wireless device includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include application-specific integrated circuit (ASIC), other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

According to some embodiments of the present disclosure, the processor 1010 may be configured to be coupled operably with the memory 1020 and the transceiver 1030. The processor 1010 may be configured to measure a quality of a serving cell and a neighboring cell. The processor 1010 may be configured to control the transceiver 1030 to receive a PLMN offset on unlicensed frequency from a network. The processor 1010 may be configured to determine ranking of the serving cell and the neighboring cell based on the PLMN offset and the measured quality. The processor 1010 may be configured to control the transceiver 1030 to perform a cell reselection based on the determined ranking.

According to some embodiments of the present disclosure, the processor 1010 may be configured to measure control the transceiver 1030 to receive a PLMN information of the neighboring cell from the network. The processor 1010 may be configured to determine whether the neighboring cell belongs to registered PLMN and/or equivalent PLMN based on the PLMN information. The processor 1010 may be configured to apply the PLMN offset to the neighboring cell to determine the ranking of the serving cell and the neighboring cell, when the neighboring cell belongs to the registered PLMN and/or equivalent PLMN.

According to some embodiments of the present disclosure shown in FIG. 10, a processor 1010 of a wireless device may consider a PLMN condition for determining ranking of cells on unlicensed frequency. The processor 1010 of the wireless device may perform random access with the highest ranked cell (or the best ranked cell), since the highest ranked cell would belong to registered PLMN and/or equivalent PLMN.

The present invention may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 11:
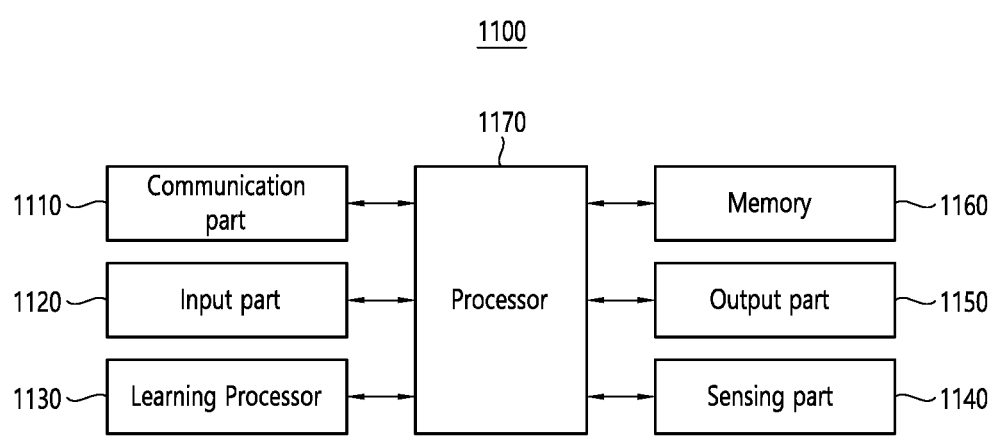
FIG. 11 shows an example of an AI device to which the technical features of the present invention can be applied.

FIG. 11 shows an example of an AI device to which the technical features of the present invention can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 11, the AI device 1100 may include a communication part 1110, an input part 1120, a learning processor 1130, a sensing part 1140, an output part 1150, a memory 1160, and a processor 1170.

The communication part 1110 can transmit and/or receive data to and/or from external devices such as the AI devices and the AI server using wire and/or wireless communication technology. For example, the communication part 1110 can transmit and/or receive sensor information, a user input, a learning model, and a control signal with external devices. The communication technology used by the communication part 1110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1120 can acquire various kinds of data. The input part 1120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1120 can acquire input data to be used when acquiring an output using learning data and a learning model for model learning. The input part 1120 may obtain raw input data, in which case the processor 1170 or the learning processor 1130 may extract input features by preprocessing the input data.

The learning processor 1130 may learn a model composed of an ANN using learning data. The learned ANN can be referred to as a learning model. The learning model can be used to infer result values for new input data rather than learning data, and the inferred values can be used as a basis for determining which actions to perform. The learning processor 1130 may perform AI processing together with the learning processor of the AI server. The learning processor 1130 may include a memory integrated and/or implemented in the AI device 1100. Alternatively, the learning processor 1130 may be implemented using the memory 1160, an external memory directly coupled to the AI device 1100, and/or a memory maintained in an external device.

The sensing part 1140 may acquire at least one of internal information of the AI device 1100, environment information of the AI device 1100, and/or the user information using various sensors. The sensors included in the sensing part 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1150 may generate an output related to visual, auditory, tactile, etc. The output part 1150 may include a display unit for outputting visual information, a speaker for outputting auditory information, and/or a haptic module for outputting tactile information.

The memory 1160 may store data that supports various functions of the AI device 1100. For example, the memory 1160 may store input data acquired by the input part 1120, learning data, a learning model, a learning history, etc.

The processor 1170 may determine at least one executable operation of the AI device 1100 based on information determined and/or generated using a data analysis algorithm and/or a machine learning algorithm. The processor 1170 may then control the components of the AI device 1100 to perform the determined operation. The processor 1170 may request, retrieve, receive, and/or utilize data in the learning processor 1130 and/or the memory 1160, and may control the components of the AI device 1100 to execute the predicted operation and/or the operation determined to be desirable among the at least one executable operation. The processor 1170 may generate a control signal for controlling the external device, and may transmit the generated control signal to the external device, when the external device needs to be linked to perform the determined operation. The processor 1170 may obtain the intention information for the user input and determine the user's requirements based on the obtained intention information. The processor 1170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1130 and/or learned by the learning processor of the AI server, and/or learned by their distributed processing. The processor 1170 may collect history information including the operation contents of the AI device 1100 and/or the user's feedback on the operation, etc. The processor 1170 may store the collected history information in the memory 1160 and/or the learning processor 1130, and/or transmit to an external device such as the AI server. The collected history information can be used to update the learning model. The processor 1170 may control at least some of the components of AI device 1100 to drive an application program stored in memory 1160. Furthermore, the processor 1170 may operate two or more of the components included in the AI device 1100 in combination with each other for driving the application program.

Figure 12:
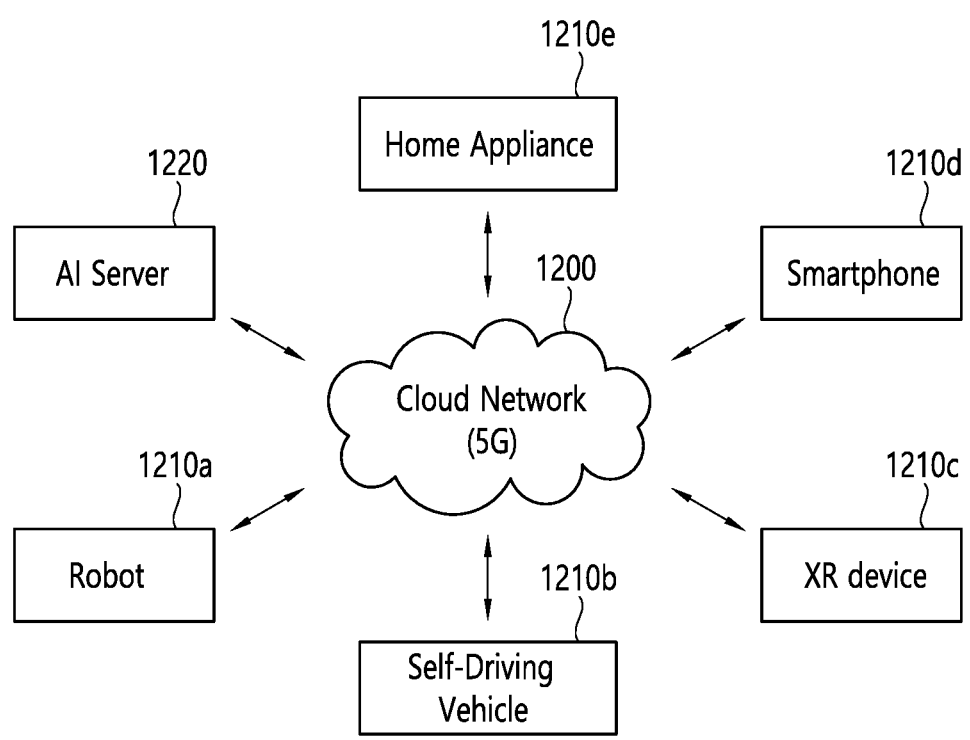
FIG. 12 shows an example of an AI system to which the technical features of the present invention can be applied.

FIG. 12 shows an example of an AI system to which the technical features of the present invention can be applied.

Referring to FIG. 12, in the AI system, at least one of an AI server 1220, a robot 1210a, an autonomous vehicle 1210b, an XR device 1210c, a smartphone 1210d and/or a home appliance 1210e is connected to a cloud network 1200. The robot 1210a, the autonomous vehicle 1210b, the XR device 1210c, the smartphone 1210d, and/or the home appliance 1210e to which the AI technology is applied may be referred to as AI devices 1210a to 1210e.

The cloud network 1200 may refer to a network that forms part of a cloud computing infrastructure and/or resides in a cloud computing infrastructure. The cloud network 1200 may be configured using a 3G network, a 4G or LTE network, and/or a 5G network. That is, each of the devices 1210a to 1210e and 1220 consisting the AI system may be connected to each other through the cloud network 1200. In particular, each of the devices 1210a to 1210e and 1220 may communicate with each other through a base station, but may directly communicate with each other without using a base station.

The AI server 1220 may include a server for performing AI processing and a server for performing operations on big data. The AI server 1220 is connected to at least one or more of AI devices constituting the AI system, i.e. the robot 1210a, the autonomous vehicle 1210b, the XR device 1210c, the smartphone 1210d and/or the home appliance 1210e through the cloud network 1200, and may assist at least some AI processing of the connected AI devices 1210a to 1210e. The AI server 1220 can learn the ANN according to the machine learning algorithm on behalf of the AI devices 1210a to 1210e, and can directly store the learning models and/or transmit them to the AI devices 1210a to 1210e. The AI server 1220 may receive the input data from the AI devices 1210a to 1210e, infer the result value with respect to the received input data using the learning model, generate a response and/or a control command based on the inferred result value, and transmit the generated data to the AI devices 1210a to 1210e. Alternatively, the AI devices 1210a to 1210e may directly infer a result value for the input data using a learning model, and generate a response and/or a control command based on the inferred result value.

Various embodiments of the AI devices 1210a to 1210e to which the technical features of the present invention can be applied will be described. The AI devices 1210a to 1210e shown in FIG. 12 can be seen as specific embodiments of the AI device 1100 shown in FIG. 11.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a wireless device in a wireless communication system, the method comprising:
   receiving, from a network, an information on of (i) a registered Public Land Mobile Networks (PLMN) for the wireless device, and/or (ii) at least one of equivalent PLMNs for the wireless device, among multiple PLMNs provided on a specific unlicensed frequency,
   wherein there is at least one PLMN, other than the registered PLMN and/or the at least one of equivalent PLMNs, which is not suitable for the wireless device among the multiple PLMNs,
   measuring a quality of cells on the specific unlicensed frequency;
   receiving, from the network, a PLMN offset on the specific unlicensed frequency, wherein the PLMN offset is a positive value;
   applying the PLMN offset only to cells belongs to the registered PLMN and/or the at least one of equivalent PLMNs based on the received information;
   determining ranking of the cells on the specific unlicensed frequency based on the applied PLMN offset and the measured quality; and
   performing a cell selection based on the determined ranking.

2. The method of claim 1, wherein the measured quality of the cells on the specific unlicensed frequency is reference signal received power (RSRP) of the serving cell and the neighboring cell.

3. The method of claim 1, wherein the method further comprises:
   receiving, from a network, (1) a frequency list, and (2) an information whether a frequency in the frequency list is a licensed frequency or an unlicensed frequency.

4. The method of claim 1, wherein the wireless device operates in IDLE state or INACTIVE state on unlicensed frequency.

5. The method of claim 1, wherein the wireless device is an autonomous driving apparatus in communication with at least one of a mobile terminal, a network, and/or autonomous vehicles other than the UE.

6. A wireless device in a wireless communication system, the wireless device comprising:
   a memory;
   a transceiver; and
   a processor, operably coupled to the memory and the transceiver, and configured to:
      control the transceiver to receive, from a network, an information on of (i) a registered Public Land Mobile Networks (PLMN) for the wireless device, and/or (ii) at least one of equivalent PLMNs for the wireless device, among multiple PLMNs provided on a specific unlicensed frequency,
      wherein there is at least one PLMN, other than the registered PLMN and/or the at least one of equivalent PLMNs, which is not suitable for the wireless device among the multiple PLMNs,
      measure a quality of cells on the specific unlicensed frequency;
      control the transceiver to receive, from the network, a PLMN offset on the specific unlicensed frequency, wherein the PLMN offset is a positive value;
      apply the PLMN offset only to cells belongs to the registered PLMN and/or the at least one of equivalent PLMNs based on the received information;
      determine ranking of the cells on the specific unlicensed frequency based on the applied PLMN offset and the measured quality; and
      control the transceiver to perform a cell selection based on the determined ranking.

* * * * *